Dec. 18, 1945.    J. W. GILLON    2,391,152
RANGE FINDER ADJUSTING MECHANISM
Filed Dec. 31, 1943
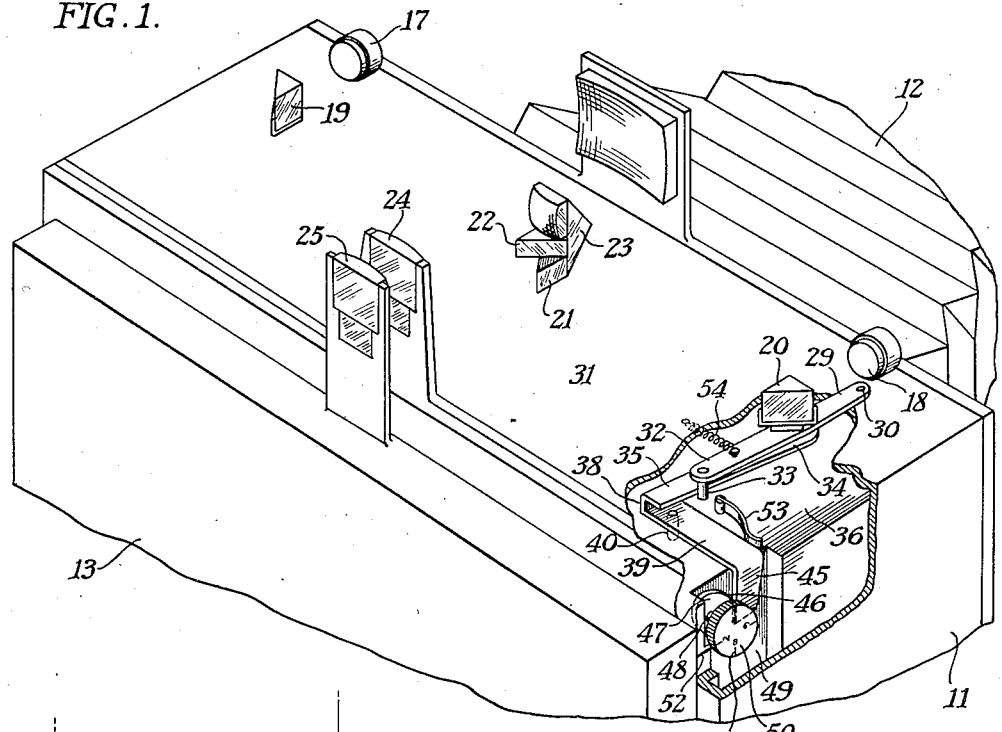
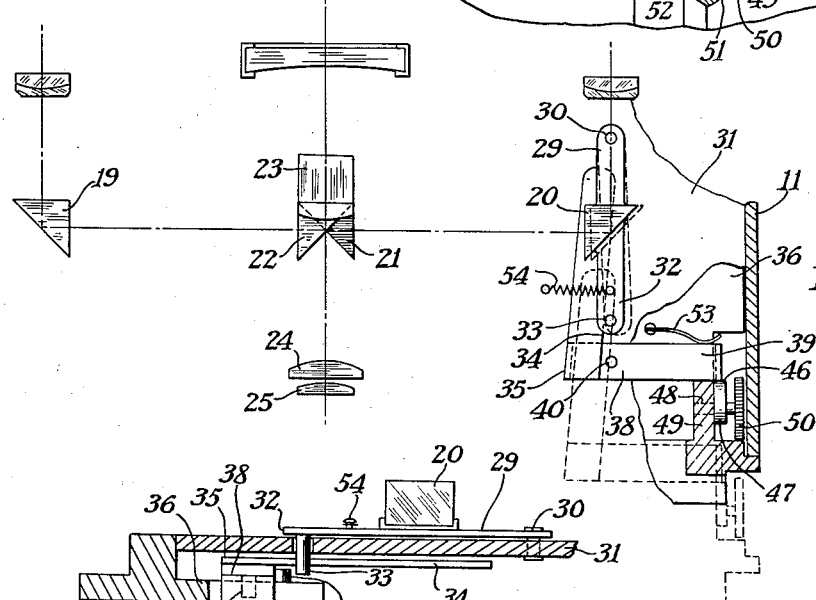
JOHN WARREN GILLON
INVENTOR Patented Dec. 18, 1945

2,391,152

UNITED STATES PATENT OFFICE 2,391,152

RANGE FINDER ADJUSTING MECHANISM

John Warren Gillon, Rochester, N. Y., assignor to Eastman Kodak Company, Rochester, N. Y., a corporation of New Jersey Application December 31, 1943, Serial No. 516,443

4 Claims. (Cl. 95—44)

The present invention relates to photographic cameras, and more particularly to cameras provided with a range finder connected to and actuated by the camera focusing mechanism.

In such cameras, the range finder is usually provided with a movable optical element or member, the movement of which is in proper relation with the adjustment of the camera focusing mechanism so that when the images in the range finder are brought into proper relation, the camera will be accurately focused, all of which is well known to those in the art.

It is some times desirable, however, to use different types of lenses when photographing different subjects. For this reason, cameras are often designed for use with a plurality of interchangeable lenses of different focal lengths. For proper operation, the relative movement between the camera focusing mechanism and the movable optical element of the range finder must be varied for each different focal length lens, as will be readily apparent to those in the art. Thus, in order to accommodate the range finder for use with such a multiplicity of lenses, means must be provided for changing such relative movement in accordance with the particular lens that is being used.

The present invention has, therefore, as its principal object the provision of a variable pitch cam for actuating the movable optical element of the range finder, the pitch of the cam being adjustable for the particular lens being used so that the movement of said element will be in proper relation with the movement of the camera focusing mechanism.

A further object of the invention is the provision of a novel arrangement for selectively adjusting the pitch of the cam in accordance with the particular focal length lens used.

And still another object of the invention is the provision of a variable pitch cam and adjusting means therefor which are simple in construction, easy to operate, inexpensive to manufacture, and highly effective in use.

To these and other ends, the invention resides in certain improvements and combinations of parts, all as will be hereinafter more fully described, the novel features being pointed out in the claims at the end of the specification.

In the drawing:

Fig. 1 is a perspective view of a camera and attached range finder, with parts removed and parts cut away, showing the relation of the range finder to the camera, and the adjustable mechanism for positioning the movable optical element of the range finder;

Fig. 2 is a partial plan view of Fig. 1 showing the arrangement of the movable optical element of the range finder and the positioning mechanism for the variable pitch actuating cam; and Fig. 3 is a vertical sectional view of a portion of the mechanism illustrated in Fig. 2, as viewed from the right side thereof.

Similar reference numerals throughout the various views indicate the same parts.

The drawing shows a combination camera and range finder having a camera body 11 which carries an extendible bellows 12, the outer end of which has mounted thereon a lens holder or mount, not shown, adapted to selectively receive lenses of different focal lengths. As neither the lenses nor the mounts therefor constitute a part of the present invention, a showing thereof is not deemed necessary.

In this embodiment, the lens mount remains stationary and focusing is accomplished by moving a film holder or back member 13 toward and away from the lens, as will be readily apparent. The holder or back 13 telescopes within the camera body 11, in any suitable and well-known manner, and is adapted to receive a sensitive element, such as a film or plate which is to be exposed. The term "film" is thus used in a generic sense to cover any photographic sensitized material adapted to be exposed by light rays to form an image.

The range finder comprises a pair of lens elements 17 and 18 spaced the base distance and positioned in front of a pair of similarly spaced reflecting members or elements such as prism 19 and 20. These prisms direct the two light beams along the base line to a beam combining an erecting system comprising prisms 21, 22, and 23, which direct the combined beams towards the lenses 24 and 25 adjacent the observer's eyes, as will be apparent.

As is well known, in range finders of this type one of the reflecting elements, such as the prism 19, is held stationary, while the other reflecting member, such as the prism 20, is movably or adjustably mounted so that the position thereof may be varied with the variation in the range t the object being cited upon. It is usual practice to couple or connect the movable prism 20 to the camera focusing mechanism so that when the latter is adjusted the prism 20 will be simultaneously moved in proper relation so that when the two images of the range finder are brought into proper relation the camera will be automatically focused, all as well known to those in the art.

To secure this result, the present invention mounts the prism 20 on a lever 29 one end of which is pivotally connected at 30 to the top 31 of the camera body 11, as clearly illustrated in the drawing. The other or free end 32 of the lever 29 is provided with a depending pin 33 adapted to engage a straight-line cam 34 formed on a member 35. The latter is mounted on and may be fixedly secured to the top wall 36 of the portion of the film holder 13 telescopically positioned within the camera body 11, as clearly shown in Fig. 1. However, for reasons to be presently described, the member 35 preferably forms one arm of bellcrank lever 38 pivoted at 40 on the wall 36 having a second arm 39 extending normal to the arm 35 and towards the side of the camera body, as clearly illustrated in Figs. 1 and 2.

It will now be apparent from an inspection of the drawing, particualrly Fig. 1, that when the film holder or back 13 is moved for focusing, the bellcrank lever 38 will move as a unit therewith. Such movement will cause the pin 33 on the lever 29 to move along the straight-line cam 34 to rock the lever 29 about its pivot 30 to vary the position of the prism 20. Such rocking will be, of course, in proper relation to the movement of the back 13 so that when the two images of the range finder are brought into proper relation, the back 13 will have been moved the exact amount to focus the camera on the object being cited upon. By means of this arrangement, the movable prism 20 is connected to and actuated by a cam carried by and movable with the focusing mechanism, the back 13.

It will be now apparent that if the bellcrank lever 38 were fixedly mounted on the wall 36, the straight-line cam 34 would have a fixed pitch and would therefore, impart a certain definite relative movement to the prism 20. Obviously, such movement of the prism 20 would be suitable only for a lens of one specific focal length, and would be entirely unsuited for a lens of another focal length.

However, it may be desirable to use lenses of different focal lengths when photographing different subjects. For this reason, cameras are often designed for use with a plurality of interchangeable lenses, each differing in focal length. In order that such lenses may be used with the structure above described, means must obviously be provided for changing the slope or pitch of the cam 34 so that the movement imparted to the movable prism 20 will be in strict accordance with the focal length of the particular lens being used, as will be apparent. To secure this result, means is provided for moving the bellcrank about its pivot 40 to change or vary the pitch of the cam 34, such variation differing for each lens used and insuring that when the images of the range finder are brought into proper relation the camera will be in exact focus for the particular focal length of the lens being used.

To secure this result, the arm 39 of the bellcrank lever 38 has the free end thereof bent down, as shown at 45, to engage the operating face 46 of a cam 47 rotatably mounted on a stud 48 carried by the side wall 49 of the back 13, as best shown in Fig. 1. The stud 48 has secured thereto an operating knob 50 by which the cam 47 may be rotated to pivot the bellcrank 38 on its pivot 40 to vary the pitch or slope of the cam 34 to selectively adapt the range finder for use with lenses of different focal lengths. The knob 50 carries a suitable scale 51 which cooperates with a fixed line 52 formed on the wall 49 to indicate the particular lens for which a cam 34 is adjusted. A spring 53 serves to retain the end 45 of the arm 39 in engagement with the cam 47, while another spring 54 holds the pin 33 in operating engagement with the variable pitch cam 34.

It will now be apparent that each time a lens of a different focal length is used, the knob 50 is adjusted to bring the proper portion of the scale 51 into registry with the mark 52. Such adjustment of the knob 50 serves to rotate the adjustable cam 47 which will then rock the bellcrank 38 about its pivot 40 to shift or vary the pitch of the cam 34 relative to the pin 33. Thus each time a new lens is used, the pitch of the cam 34 is altered to suit the focal length of the particular lens being used. After the cam 34 has been thus altered or adjusted, the movement of the prism 20 and the back 13 will be in strict accordance with the focal length of the lens. The result is that when the two images of the range finder have been brought into proper relation, during the focusing operation, the camera will be automatically focused.

Such an arrangement permits the use of a wide variety of interchangeable lenses of different focal lengths, and assures proper adjustment of the range finder for the particular lens being used. All that the operator has to do is to be sure that the knob 50 has been properly set for the particular lens being used. After that, the range finder is actuated by movement of the back 13 to focus the camera in strict accordance with the focal length of the lens. The present invention thus provides a range finder actuating cam, the pitch of which may be easily, readily and selectively adjusted or altered to adapt the range finder to the particular focal length of the lens being used. After the cam pitch has been thus adjusted, the control of the movable range finder element is in strict accordance with the focal length of the lens being used.

While only one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. In a photographic camera adapted for use with interchangeable lenses of different focal lengths and provided with a portion adapted to be moved along the axis of the camera lens for focusing, the combination with a range finder carried by said camera and having an optical element adapted to be moved in accordance with the adjustments of said portion, a lever carrying said element and pivotally mounted on said camera for movement transversely of said axis to move said element about said pivot, a second lever rockably mounted on and movable as a unit with said portion, a cam carried by said second lever and inclined in a direction transverse to the movement of said portion, a pin on said first lever engaging said cam so that movement of said portion and cam along said axis serves to simultaneously move said element about said pivot to adjust said element in accordance with the focusing movement of said portion, and a second cam operatively connected to said second lever for rocking said first cam transversely of said axis to alter the angular relation between said first cam and its direction of movement to vary the pitch of said cam.

2. In a photographic camera adapted for use with interchangeable lenses of different focal lengths and provided with a portion adapted to be moved along the axis of the camera lens for focusing, the combination with a range finder carried by said camera and having an optical element adapted to be moved in accordance with the adjustments of said portion, a lever carrying said element and pivotally mounted on said camera for movement transversely of said axis to move said element about said pivot, a bell crank lever rockably mounted on and movable as a unit with said portion, a straight line cam carried by one arm of said bell crank lever and inclined in a direction transversely of said axis, a pin depending from said first lever and engaging said cam so that movement of said portion along said axis will pivot said first lever to move said element in accordance with the focusing adjustment of said portion, and a second cam operatively connected to the other arm of said bell crank lever to rock the latter on said portion to vary the angular position of said cam relative to the movement thereof with said portion to vary the cam pitch to alter thereby the movement of said element in accordance with the focal length of the lens positioned on the camera.

3. In a photographic camera adapted for use with interchangeable lenses of different focal lengths and provided with a portion adapted to be moved along the axis of the camera lens for focusing, the combination with a range finder carried by said camera and having an optical element adapted to be moved in accordance with the adjustments of said portion, a lever carrying said element and pivotally mounted on said camera for movement transversely of said axis to move said element about said pivot, a bell crank lever rockably mounted on and movable as a unit with said portion, a straight line cam carried by one arm of said bell crank lever and inclined in a direction transversely of said axis, a pin depending from said first lever and engaging said cam so that movement of said portion along said axis will pivot said first lever to move said element in accordance with the focusing adjustment of said portion, and a second cam mounted on and movable on a unit with said portion and connected to said other arm to rock said bell crank lever on said portion to vary the angular position of said first cam relative to the movement thereof with said portion to alter the pitch of said first cam to change thereby the relative movement of said first lever and said portion to compensate for the focal length of the lens on the camera.

4. In a photographic camera adapted for use with interchangeable lenses of different focal lengths and provided with a portion adapted to be moved along the axis of the camera lens for focusing, the combination with a range finder carried by said camera and having an optical element adapted to be moved in accordance with the adjustments of said portion, a lever carrying said element and pivotally mounted on said camera for movement transversely of said axis to move said element about said pivot, a bell crank lever rockably mounted on and movable as a unit with said portion, a straight line cam carried by one arm of said bell crank lever and inclined in a direction transversely of said axis, a pin depending from said first lever and engaging said cam so that movement of said portion along said axis will pivot said first lever to move said element in accordance with the focusing adjustment of said portion, a depending portion formed on the other arm of said bell crank, and a second cam mounted on and movable as a unit with said portion and engaging said depending portion so that adjustment of said second cam serves to rock said bell crank on said portion to vary the angular position of said one arm with said portion to alter thereby the pitch of said first cam to change the relative movement of said first lever upon movement of said portion to adjust said element in accordance with the focal length of the lens being used.

JOHN WARREN GILLON.